March 13, 1934.  G. A. WUEST  1,951,046
FRUIT WASHING AND DRYING MACHINE
Filed Sept. 22, 1927  2 Sheets-Sheet 1
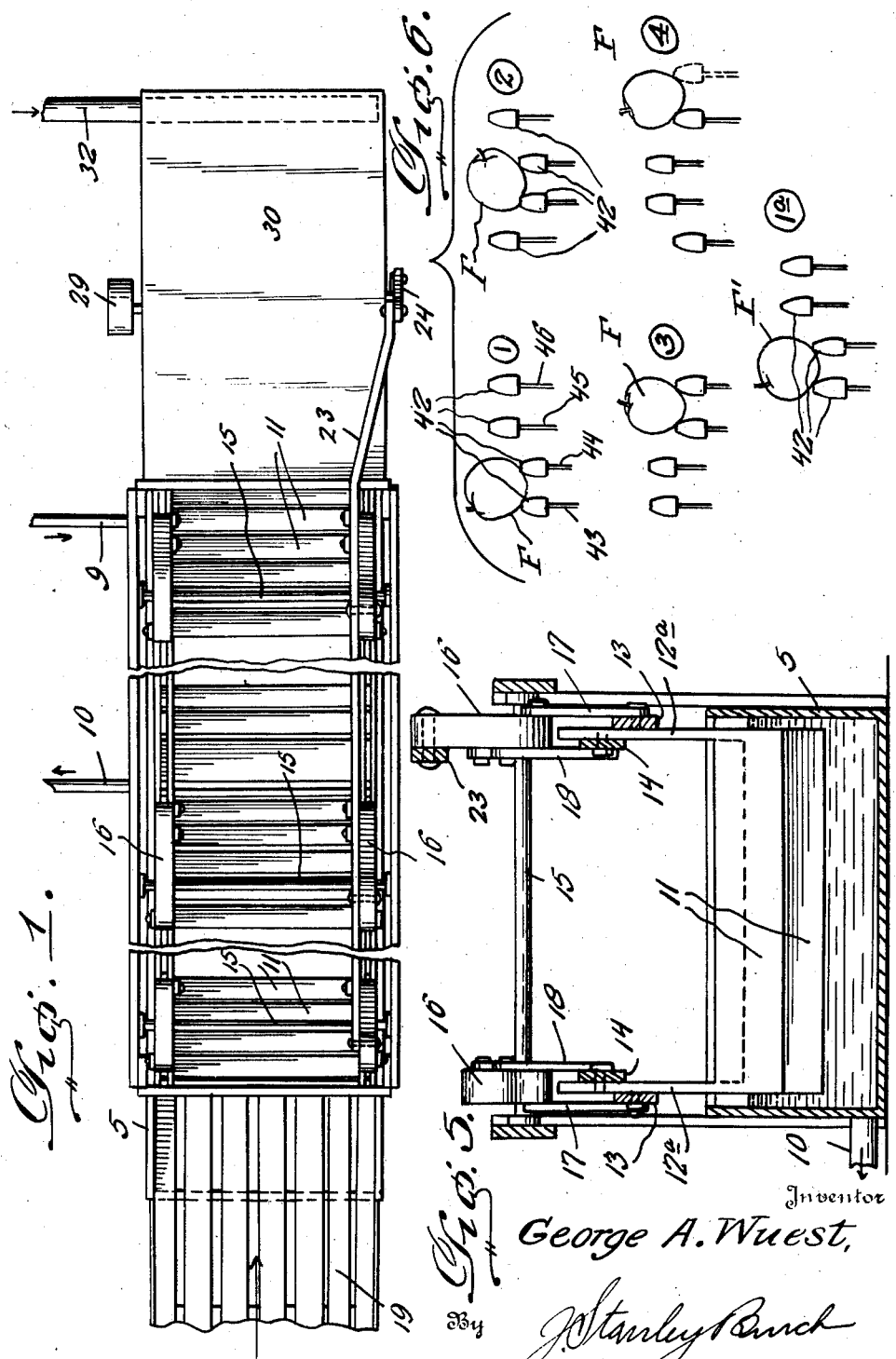
Inventor
George A. Wuest,
By J. Stanley Burch
Attorney

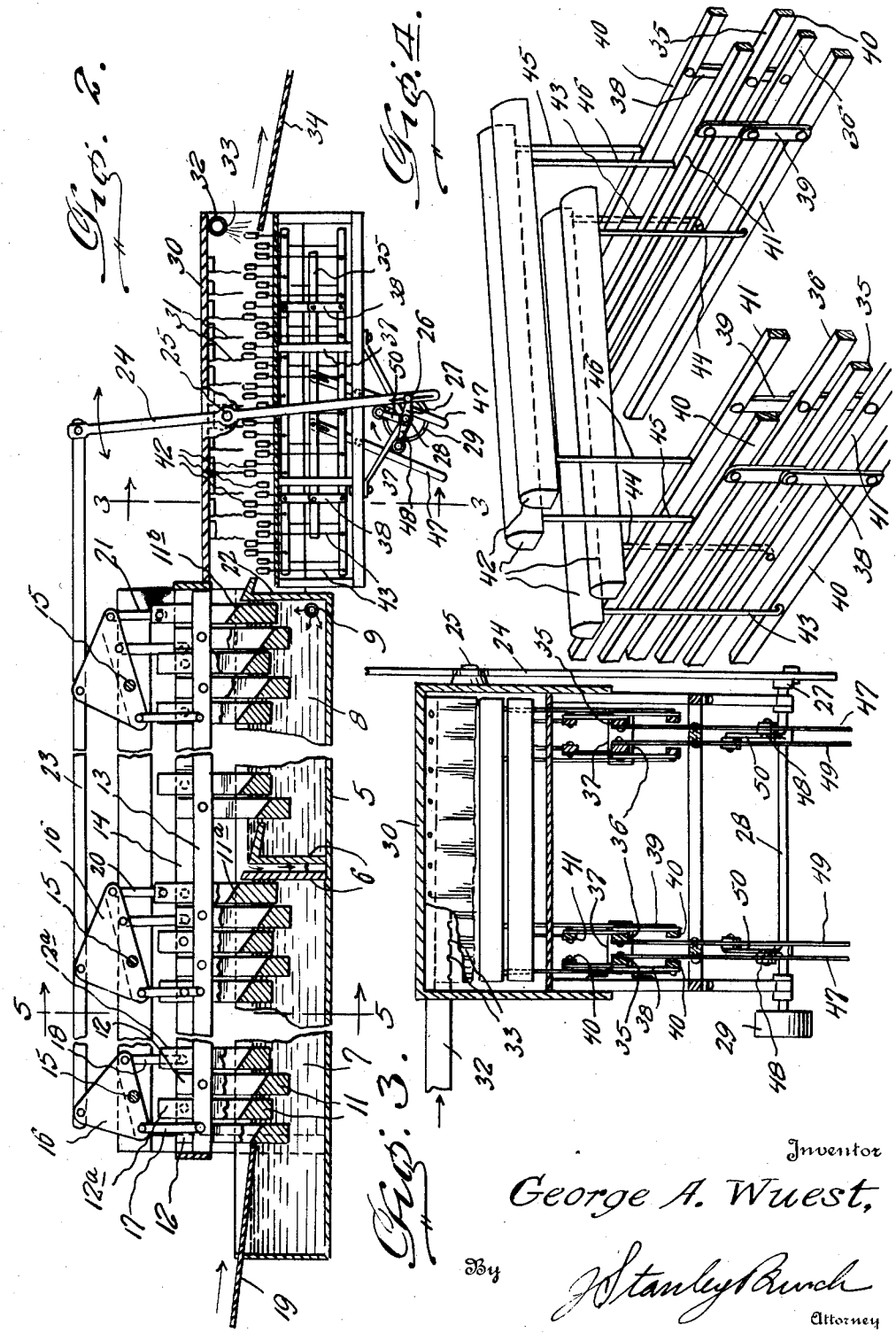

Patented Mar. 13, 1934

1,951,046

UNITED STATES PATENT OFFICE 1,951,046

FRUIT WASHING AND DRYING MACHINE

George A. Wuest, Hood River, Oreg.

Application September 22, 1927, Serial No. 221,173

7 Claims. (Cl. 146—194)

My invention has for its object the cleaning of fruit such as apples and pears, which while growing are sprayed with a poisonous solution. This adheres firmly as a film to the skins of the fruit and has generally been removed by washing the fruit in a weak acid solution. The washing of the fruit must be sufficient to remove the spray to the so-called "tolerance limit"; at the same time the fruit may not be permitted to remain in the acid solution for such length of time that it has an opportunity to burn and spoil the fruit.

I have discovered that sprayed fruit may be effectively and safely washed by repeated dipping to a limited depth in the acid solution; each dipping producing agitation and waves in the surface of the solution which splash up between the adjacent pieces of fruit, assuring that the entire surface of the fruit is splashed and soused with the solution; but then immediately lifting the fruit out of the solution again, so that the fruit will not be burn and spoilt.

A still further object is to provide a drying chamber into which the fruit is discharged from the rinsing bath, and to provide in said chamber means to convey the fruit through said chamber, means tending to wipe the moisture off the surface of the fruit as it is moved through the drying chamber so that the drying operation is facilitated, and means to subject the fruit to the direct action of a drying current of air after the moisture has been subjected to said wiping means and before the fruit is discharged from the drying chamber.

Another object of the invention is to provide a fruit washing and drying machine which is simple and durable in construction and efficient and reliable in operation, and by means of which the washing and drying of fruit may be continuously performed in an efficient and expeditious manner.

I attain my objects by the process which comprises passing the fruit thru a body of chemical solution, into which the fruit is repeatedly dipped and immediately lifted out again, whereby to souse the fruit repeatedly in the solution without permitting it to remain therein for an interval sufficient to burn and spoil it.

This process I carry into effect by the apparatus hereinafter fully described.

In the drawings:

Figure 1 is a top plan view, partly broken away, of an apparatus embodying the present invention.

Figure 2 is a view, partly in central longitudinal section and partly in side elevation, of the apparatus shown in Figure 1.

Figure 3 is an enlarged transverse section on line 3—3 of Figure 2.

Figure 4 is an enlarged fragmentary perspective view of the means for conveying the fruit through the drying chamber.

Figure 5 is an enlarged transverse section on line 5—5 of Figure 2, and

Figure 6 diagrammatically illustrates the successive steps or positions of the fruit sustaining and moving cross bars or slats of one of the plurality of sets of such bars which are embodied in the means for conveying the fruit through the drying chamber.

In the drawings, 5 indicates an elongate tank open at the top and divided by transverse partitions 6, 6a into an acid solution washing compartment 7 and a rinsing compartment 8. The washing compartment 7 contains a suitable chemical solvent such as dilute hydrochloric acid by repeated dipping into which the film of poisonous insecticide spray still carried by the fruit will be efficiently washed off. The compartment 8 is continuously supplied with fresh clean water by the supply pipe 9 at the delivery end of said compartment, the excess water being conducted from the receiving end of this compartment by the drain pipe 10 leading from the tank at a point between the spaced walls of the partitions 6, 6a. The wall 6a at the forward end of the compartment 8 is shorter than the wall at the other end of the compartment so that the water will overflow the wall 6a and pass out through drain pipe 10. By this arrangement, clear water is maintained at the discharge end of compartment 8 so that the foreign matter will be thoroughly rinsed from the fruit when it is discharged from the tank to be dried.

Means are provided to convey the fruit through the said washing and rinsing compartments and simultaneously thoroly to wash the fruit by repeated dipping or plunging and sousing of the fruit in the solution, and finally washing of the same in rinsing water. These means comprise a series of groups of successive transversely disposed fruit carriers or bars 11 vertically reciprocable in and relatively to the surface of the liquid in the solution compartment or tank. There are four bars to each group, the legs 12 of alternate ones of which are attached to longitudinal bars 13, and the legs 12a of the remaining ones of which are attached to further longitudinal bars 14.

Mounted above each set of conveying elements on a transverse rock shaft 15 are rocker arms 16 whose opposite ends are respectively connected by links 17 and 18 with the bars 13 and 14, whereby the first and third elements 11 of each set will be raised when the second and fourth element thereof are lowered, and vice versa, when the rocker arms are rocked. The horizontal connecting members of the bars 11 have their upper surfaces inclined toward the discharge end of the solution tank, 11a, at an angle of between 26 and 28 degrees with the horizontal, so that the fruit will be successively tumbled over in rolling forward from one of the carriers 11 to another. Further, since the bars 11a are moved vertically in the surface of the liquid they serve as agitating elements to maintain a uniform condition in the acid washing solution. A suitable inclined feed table 19, preferably of slatted form, is provided at the receiving end of the tank to facilitate delivery of the fruit onto the fruit carriers 11 of the first group in compartment 7. In order to effect delivery of the fruit from the last carrier 11 of compartment 7 over the partition 6 and onto the first carrier 11 of compartment 8, and delivery of the fruit from the tank at the discharge end of the latter, additional carriers 11a and 11b are provided which are connected by links 20 and 21 with the rocker arms 16 of the last groups of carriers 11 in compartments 7 and 8, these particular rocker arms having extensions to which the links 20 and 21 are pivoted, whereby the carriers 11a and 11b are given longer strokes than the carriers 11 to insure raising of the fruit above the top of partition 6 and the discharge end of tank 5 when it reaches these points. As the upper faces of the carriers 11a and 11b and the partition 6 and tank wall 22 are inclined forwardly, the fruit will be tumbled forward from one carrier onto the other as mentioned and thus moved thru the washing solution.

To effect simultaneous movement of the rocker arms 16, those at one side of the tank may have upward extensions pivotally connected to a connecting rod 23, one end of which is pivoted to the upper end of a vertical lever 24 which is pivoted intermediate its ends as at 25 and has its lower end operatively connected by a pin and slot connection as at 26 with a crank 27 on one end of a transverse horizontal shaft 28 which may be suitably driven, as by use of pulley 29 secured thereon.

The vertically reciprocated fruit carriers 11 operates to dip the fruit repeatedly into the acid solution just below the surface and then immediately to lift the fruit out of the solution again. The dipping agitates the solution and produces waves which splash up between the fruit, and thus the fruit is thoroly soused, insuring the efficient removal of the spray remnant which it still carries. But the fruit does not remain in the acid solution for sufficient length of time to cause it to be burnt and spoilt by the acid solution.

Furthermore, by the repeated dipping and sousing of the fruit in the acid solution as mentioned, the removal of the spray film which it carries is greatly expedited and is accomplished in considerably shorter period of time than if the fruit were just dragged thru the acid solution.

A longitudinally arranged open-ended drying chamber 30 is disposed at the discharge end of tank 5 to receive the cleaned fruit, and attached to the roof or top wall of this chamber are a series of transverse rubber or fabric wiping strips 31 which depend in the path of the fruit so as to spread the moisture over the surface of the latter for facilitating drying thereof as it is conveyed through the drying chamber.

A transverse pipe 32 is disposed above the path of the fruit at the discharge end of the chamber 30, and this pipe is adapted to be connected to a suitable source of hot air supply and has a series of openings 33 in the bottom thereof to permit the hot air to issue therefrom in downwardly directed jets onto the passing fruit to complete drying thereof prior to discharge of the fruit onto the delivery table 34 arranged at the discharge end of chamber 30.

Means are provided for conveying the fruit through the chamber 30, the same embodying horizontal longitudinal slide bars 35 and 36 arranged at each side of and below the chamber 30 and guided in brackets 37. Arranged above and below the slide bars 35 and 36 and operatively connected to the latter by means of toggle links 38 and 39 are supporting bars 40 and 41. Carried by the bars 40 and 41 are successive sets of conveying elements including fruit-sustaining cross bars 42, four of which are provided in each set and all of which are arranged transversely of the chamber 30 above the bottom of the latter. As shown, the first cross bar 42 of each set is carried by the upper ends of vertical supporting rods 43 fixed to the lower bars 40, the second cross bar 42 of each set is carried by the supporting rods 44 fixed to the lower bars 41, the third cross bar 42 of each set is carried by the rods 45 fixed to the upper bars 40, and the fourth cross bar 42 of each set is carried by the rods 46 fixed to the upper bars 41, the rods 43, 44, 45 and 46 slidably projecting through the bottom of chamber 30. Loosely pivoted to the slide bars 35 are the upper ends of pairs of levers 47, between the lower ends of these levers of each pair of which is arranged a crank arm 48 of shaft 28, and similarly pivoted to the slide bars 36 are the upper ends of pairs of levers 49, between the lower ends of the levers of each pair of which is arranged a roller arm 50 on shaft 28. By this arrangement, the first two cross bars 42 of each set may be disposed at the same level but below the level of the third and fourth cross bars 42 of each set when the bars 40 and 41 are separated and the toggle links 38 and 39 are straightened, and when the shaft 28 is rotated, the bars 42 will be moved to successive different relative positions, to feed the fruit through chamber 30 as illustrated with respect to one complete cycle of operation in Figure 6. When the shaft 28 is turned, each arm 48 will strike one lever 47 and the bars 35 will be slid so as to break the toggle links 38 and raise the lower bars 40 while lowering the upper bars 40, thereby raising the first cross bar 42 and lowering the third cross bar 42 of each set from the position (1) of Figure 6 to the position (2) thereof. The arms 50 next strike the proper ones of levers 49 so as to move slide bars 36 and break toggle links 39, thereby raising the second cross bar 42 and lowering the fourth cross bar 42 as shown in position (3) of Figure 6. The arms 48 then operate the levers 47 to lower the first cross bar 42 and raise the third cross bar 42 as shown in position (4), and then the arms 50 operate the levers 49 to lower the second bar 42 and raise the fourth bar 42, thereby returning to the relation of position (1) as shown in position (1a) to receive the following fruit F', the travel or movement of the preceding fruit F being clearly shown until it reaches the next set of bars 42. This cycle of operation is continued to feed the fruit continuously through the drying chamber as it is supplied from the washing means.

The operation having been dealt with during the progression of the description, it is believed that the same will be readily understood without further detailed description thereof.

Minor changes may be made without departing from the spirit and scope of the invention as claimed.

What I claim as new is:—

1. In a fruit cleaning machine of the character described, a tank for liquid, a series of transverse fruit carriers in said tank vertically and alternately reciprocable relatively to the surface level of the liquid in the tank, the upper face of said fruit carriers being inclined towards the discharge end of the tank, means for vertically reciprocating all of the said fruit carriers alternately, whereby to dip the fruit deposited on the said fruit carriers into and out of said liquid at short intervals to effect the cleaning of the fruit and move the fruit progressively towards the discharge end of the tank.

2. In a fruit cleaning machine of the character described, a tank for liquid, a series of transverse fruit carriers in said tank vertically and alternately reciprocable relatively to the surface level of the liquid in the tank, the upper face of said fruit carriers being inclined at an angle between 26 and 28 degrees with the horizontal, towards the discharge end of the tank, means for vertically reciprocating all of the said fruit carriers alternately, whereby to dip the fruit deposited on the said fruit carriers into and out of said liquid at short intervals to effect the cleaning of the fruit and move the fruit progressively towards the discharge end of the tank.

3. In a fruit cleaning machine of the character described, a tank for liquid, a series of transverse fruit carriers in said tank vertically and alternately reciprocable relatively to the surface level of the liquid in the tank, the upper face of said fruit carriers being inclined towards the discharge end of the tank, rocker arms to which certain of said fruit carriers are connected and means for rocking said rocker arms in synchronism, whereby to dip the fruit deposited on the said fruit carriers into and out of said liquid at short intervals to effect the cleaning of the fruit and move the fruit progressively towards the discharge end of the tank.

4. In a fruit cleaning machine of the character described, a tank for liquid, a series of transverse fruit carriers in said tank vertically and alternately reciprocable relatively to the surface level of the liquid in the tank, the upper face of said fruit carriers being inclined at an angle between 26 and 28 degrees with the horizontal towards the discharge end of the tank, rocker arms to which certain of said fruit carriers are connected and means for rocking said rocker arms in synchronism, whereby to dip the fruit deposited on the said fruit carriers into and out of said liquid at short intervals to effect the cleaning of the fruit and move the fruit progressively towards the discharge end of the tank.

5. In a device of the class described, the combination of a supporting frame, shafts horizontally journaled within the frame and at oppositely disposed ends thereof, means for imparting a rocking motion to each of the shafts, pairs of side bars adapted for having an up and down movement imparted thereto, as the shafts are rocked, recurring series of cross yokes supported at different elevations by the side bars, and so arranged that an article supported upon the cross yokes will be progressed uniformly and longitudinally of the side bars as an up and down movement is imparted to the cross yokes, through the rocking action being imparted to the shafts journaled relative to the supporting frame.

6. In a device of the class described, the combination with a frame-work having a receiving and a delivering station, of a conveyor for delivering articles in a wave-like movement between the two stations, said conveyor comprising a plurality of pairs of cross yokes disposed in spaced relation transversely of the frame work, means for imparting synchronic vertical movement to all of these yokes progressively and in the direction of the delivering station, said means comprising supporting and side bars running longitudinally of the frame and being in spaced relationship, shafts journaled at oppositely disposed ends of the frame, means for imparting a rocking motion to each of the shafts, and means for changing said rocking motion to vertical motion and transferring the vertical motion to the side bars.

7. In a fruit washing machine the combination of a tank for a washing solution, means for conveying the fruit thru the tank, comprising a series of adjacent, transversely extending, vertically reciprocable fruit carriers, their upper faces adapted to tumble the fruit forward and means for reciprocating said fruit carriers relatively, alternately dipping their tops just below, and then immediately lifting the same above the surface of the solution, whereby the fruit is repeatedly soused in, and immediately removed again from the solution.

GEORGE A. WUEST.